June 4, 1957  A. T. DILDILIAN  2,794,759
METHOD OF MAKING A RESIN IMPREGNATED FIBER GLASS MAT AND PRODUCT
Filed June 23, 1954  3 Sheets-Sheet 1

Inventor
Ara T. Dildilian
by
Atty.

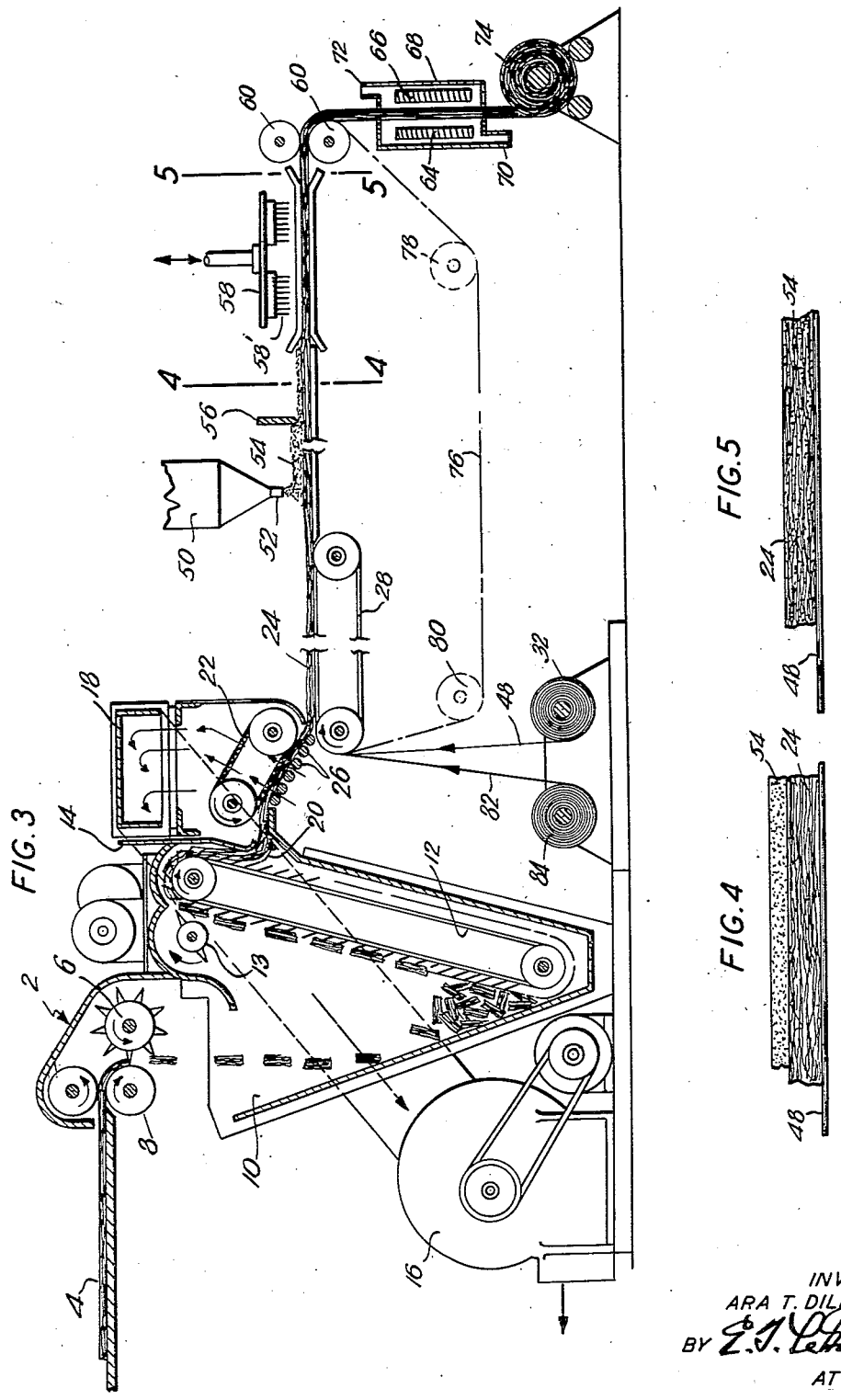

2,794,759

METHOD OF MAKING A RESIN IMPREGNATED FIBER GLASS MAT AND PRODUCT

Ara T. Dildilian, Suffield, Conn., assignor, by mesne assignments, to Fiber Glass Industries, Inc., Amsterdam, N. Y., a corporation of New York Application June 23, 1954, Serial No. 438,720

13 Claims. (Cl. 154—101)

The present invention relates to a sheet material, suitable for use as a molding material in the formation of glass fiber-reinforced plastic articles by heat and pressure molding, and to a method of making the same.

Molded plastic articles reinforced by a relatively large percentage of extremely fine glass fiber or filament have proved to be extremely useful in a great number of applications requiring in the finished article or structural part not only the desirable properties of molded plastic materials but, also, high tensile strength and high resistance to mechanical abuse. Representative of such applications are the manufacture of washing machine tubs and covers, trays, chairs and automobile bodies.

Such articles have heretofore been formed by placing a mat of glass fibers within a heated metal mold and then pouring over the mat a liquid resin molding compound. This is a difficult operation as it is impossible to distribute the liquid over the surface of the glass mat in such a way that the proper amount of liquid resin forming material will be present at each point, particularly when the object to be molded is of an intricate shape or contains compound curves, re-entrant angles and other irregular shapes. The practice is also objectionable because the resin invariably is spilled and becomes set on parts of the equipment where it is not wanted.

The non-uniform or improper distribution of the resin-forming material over the surface of the glass fiber re-inforcing mat means that as the mold closes it is necessary for the resin forming material to travel transversely to become distributed uniformly in and through the fibers. A time lag, therefore, must be allowed for the resin to travel, decreasing the efficiency of the press.

Furthermore, where the pieces to be molded are substantial in size, as is the case in the manufacture of automobile bodies, other serious difficulties are introduced. As the resin-forming material is poured over the mat, after placing the mat in the die, unless extreme speed is employed in applying the resin, the material will locally set or gel before the entire amount can be applied over the whole surface of the mat and the die closed. Due to such local setting, the resin-forming material thereafter cannot flow to become properly redistributed as the mold closes. This difficulty can be overcome to some extent with smaller objects by applying the resin to the mat before it is inserted in the press but this is, at best, a cumbersome, messy, slow and unsatisfactory procedure. Or slower curing resin, requiring longer press time, may be resorted to but this would not be conducive to efficient processing.

Even with the most careful operation, local concentrations of excess resin-forming material have been unavoidable; with the larger and more complex shapes a uniform distribution and consequent uniform strength have been impossible of attainment on a production basis.

To overcome the foregoing difficulties it has been suggested that the mat be pre-impregnated with a liquid resin-forming material as a step in its manufacture, before it is supplied to the molder. Adequate penetration and distribution of the resin in the mat may be obtained in a practical way by the use of a solvent solution of the resin-forming material. However, apart from the difficulties following from the low solids content of resin solutions of low enough viscosity for such impregnation use, the subsequent removal of solvent and drying out of the mat is a hazardous and expensive matter and the process has little value, being limited to relatively thin mats, approximatting ¾ oz. per sq. ft. in weight. Another method of impregnation which may be employed is passing the fibrous mat through or dipping it into a tank containing a molten resin compound. However, this latter process is limited to a few specialty resins. Moreover it is subject to the danger of the bath gelling. Further, in order that the mat may be handled practically during such processing, it has been found that the mat must have its fibers so bonded to each other as to provide a degree of coherency and structural strength of the mat which is attainable only by the expedient of chemically bonding the fibers by pre-impregnation with a bonding resin. Such bonding substantially reduces the desirable flexibility and extensibility of the mat. Such bonding material is necessarily such that it will not dissolve or soften in the resin-forming impregnating material, consequently, its presence is inherently undesirable during the subsequent molding operation, because the bonding resin superficially coats the glass strands and thereby precludes wetting out of the glass filaments with the impregnating material, which is essential for the production of a satisfactory product.

The present invention overcomes the foregoing difficulties and avoids the objections to and disadvantages of the described practices. In accordance with the invention I provide a coherent, self-sustaining low density, flexible, extensible, conformable and vapor-permeable glass fiber sheet of the desired fiber content for the formation of the finished product, which contains the full and entire amount of resin material required to produce the final molded glass fiber re-inforced plastic article, and with the resin-forming material so disposed that in the final molding operation it will assume the desired uniform distribution within the finished article: there is no requirement for the addition of resin in the mold. The entire moldable glass fiber sheet is supplied to the molder in a form which can conveniently be stored, transported and handled at the molding station. When placed in the mold it can be shaped by hand as required to conform to irregular or curved surfaces, corners and angles, to provide a uniform distribution of both glass fiber and of resin-forming compound over the entire surface of the mold. The resin-forming material is so distributed uniformly throughout the depth of the mat that it will, as the mold closes, become uniformly distributed in the resultant product, thereby substantially expediting the molding operation.

This preloaded sheet is made possible by providing a low density mat of glass fibrous material consisting essentially of short, cut, staple-length glass fibers extending generally parallel to the plane of the mat but randomly oriented in said plane, which has sufficient internal linking, bonding or interlocking of the fibers to cause the mat to be coherent and self-sustaining independently of its molding resin content. This uniting of the fibers is accomplished by means of a needling operation. The resin is added to the mat in the form of a fine dry powder. Preferably this is done prior to needling so that the needling operation mechanically introduces a quantity of the powder depthwise of the mat, providing a multitude of small pockets extending depthwise of the mat for the reception of the powder which is further distributed by the mechanical agitation of the mat and powder by the needling apparatus. Simultaneously the needling operation forces a relatively small but significant amount of fibers to be displaced so as to extend in the direction of the thickness of the mat. Thereafter, the mat and powder are treated to render the particles of resin sufficiently tacky that adjacent particles are caused to cohere or adhere into clusters of such size that they cannot escape from the sheet. During this step some adhesive bonds may be formed between the resin particles and fibers, or between the clusters and fibers, but it is a feature of my invention that such bonds are relatively very few in number so that the fibers are not substantially cross-bonded or cross linked and the mat thereby retains its desirable flexibility, vapor permeability and capacity to stretch and extend in all directions under slight shaping forces whereby it can quickly and conveniently be conformed or fitted properly and accurately to the mold by the operator by hand. Such formation of clusters, and of occasional adhesive bonds between resin material and fiber, causes the resin, despite its large amount, to be retained in the sheet so that the sheet can be handled without significant separation and loss of resin therefrom.

Preferably the short, cut, staple-length glass fiber is mainly or substantially wholly in the form of chopped up glass fibrous multi-filament strands comprising a large number of fine filaments bundled together in the manufacture of the strands and held in strand form by the incorporation of a size finish which provides a non-polar fiber surface for better bonding of the strands with plastic materials. Much greater reinforcing strength for plastic articles is obtained when the fibers are present in such strand form rather than individual filament form.

The invention will be further disclosed by reference to the accompanying drawing, wherein:

Fig. 3 is a diagrammatic vertical midsection of apparatus by which the method of the invention may be practiced;

Fig. 4 is a diagrammatic vertical section on the line 4—4 of Fig. 3 with thickness of the carrier web somewhat exaggerated for the sake of clarity of illustration; and Fig. 5 is a similar diagrammatic vertical section on the line 5—5 of Fig. 3.

Figure 1:
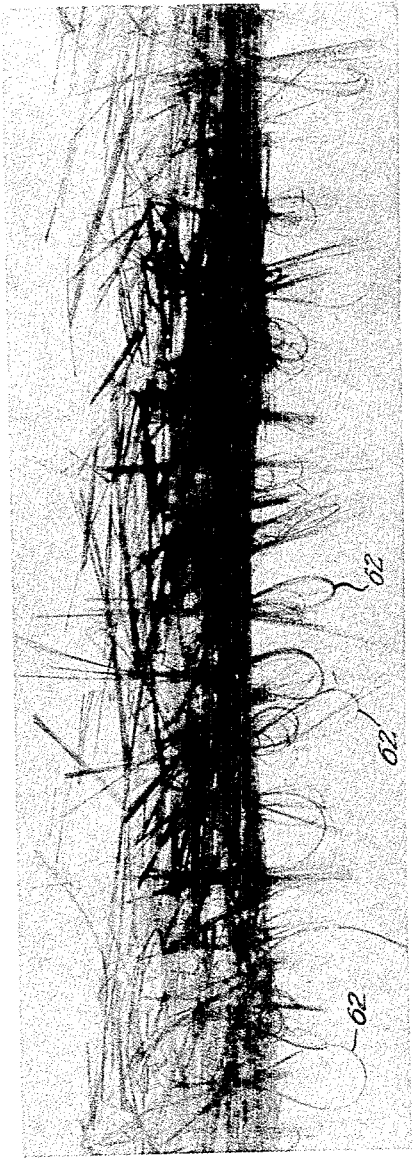
Fig. 1 is a photomicrograph (5.25×) of a section of the glass fiber mat before addition of resin thereto, showing mechanical connection or linking of the glass fibers.

Referring to Fig. 3 of the drawings, there is fed to the strand chopping device 2, a rope 4 of some hundreds of strands of the described preferred type, each composed of many individual glass filaments bonded together by a size finish. These strands are chopped into short lengths by the rotary cutter 6 as they pass over the underlying firm rubber roll 8. Several choppers may be employed if it is desired to have different lengths in the mat, for example, a range of lengths between ½ and 3 inches, or strands may be separately cut to different lengths. Preferably, however, the blades of the rotary cutter 6 are spaced unequally around the periphery of the cutter so that the pieces cut off by it are of different lengths.

The cut, short, or staple lengths are discharged into the hopper of the feeder 10, which may be of the well known Bramwell type, as shown, including a spiked apron 12 and stripper roll 13. The apron carries the cut strands over the top thereof and downwardly between the lower flight of the apron and a louver wall 14. An exhaust fan 16 draws a stream of air into the air conduit 18 from the directions indicated by the arrows. The cut lengths of glass fiber bundles are aided materially in passing from the spikes of the lower flight of apron 12 by the downwardly flowing air stream, indicated by the arrow 20, so that the cut strands are stripped clear of the spikes near the bottom of the louver 14, and then carried laterally by the air stream into the wedge-shaped opening at the upper end of the lower, i. e. the downwardly moving, flight of the foraminous screen belt 22. Air is drawn upwardly through the belt 22, against which the cut strands lodge and are formed into a uniform bat 24, being held against the belt by the air passing upwardly between the rollers 26 underlying the belt, through the bat, and through the belt 22 itself. The cut, staple-length bundles of fibers as so deposited lie primarily parallel to the faces of the bat, although they extend in random directions in any given plane parallel to the face of the bat. The bat 24 thus formed is carried downwardly by the screen belt 22 until it passes from that belt to a carrier supported and carried along by belt 28 underlying it.

At this point the operation may be varied somewhat, depending upon whether or not a carrier element is employed. If desired, the glass fibers may be deposited on a temporary carrier member, such as belt 76, which is stripped from the glass fiber mat immediately following the needling operation, or the temporary carrier may be crepe paper or other suitable material which lends itself to needling and which would be stripped from the glass fiber mat following the needling operation. Such a carrier may be fed to the bat from a supply roll such as 32. On the other hand, the carrier member may become an integral part of the finished product. It may be of such a nature that, altho it is not removed, as a result of the needling operation it loses its identity in the mat. For some purposes a more suitable product is obtained by the use as a carrier element of a membrane comprising a layer of glass fibers adhesively bonded into a coherent, self-sustaining web which is very thin as compared with the main body of the bat and which is not stripped from the mat. If such a web 48 is to be applied, it is drawn from a roll 32 and fed to underlie the screen belt 22 so as to be positioned between the belt 28 and the overlying bat of glass strands 24.

The bat is then carried along with the web 48 past a powder applying station at which is located the powder applying hopper 50. A finely-divided resin molding compound is supplied from the nozzle 52 of the hopper to the upper surface of the traveling bat as indicated at 54. The amount of powder applied is sufficient to supply all of the molding compound desired in the final molded product and will usually comprise an amount between 35% and 80% of the combined weight of powder and glass fiber in the completed sheet. As the bat travels from beneath the nozzle 52, it is passed beneath a doctor blade 56 which serves to level off and equalize the distribution of the powder widthwise of the mat. Thereafter, the bat with its layer of resin powder 54 is passed through a conventional needling device 58, being intermittently drawn therethrough by a roll pair 60, the lower roll of which, preferably of rubber, is intermittently driven in step with the vertical reciprocations of the conventional vertically reciprocating needling device 58. The needling device, by means of its barbed needles 58', draws some of the strands or portions thereof, as at 62, Fig. 1, down through the bat of cut strands and into or through the lower underlying web 48 (when such web is present), leaving the bat with a small but significant amount of fiber extending transversely depthwise of the mat. At the same time the needling operation introduces the powder depthwise of the bat. The passage of the needles through the bat provides a multitude of small pockets extending vertically in the bat. The agitation and vibration of the bat and powder by the needles causes some of the resin particles to fall into and fill these pockets and in general brings about a distribution of a quantity of the powder in the voids of the bat.

Figure 2:
Fig. 2 is a photomicrograph (20×) of a section of one form of the completed sheet of the invention.

From the rolls 60 the mat is passed downwardly through apparatus for rendering the resin particles tacky, without causing the resin to flow, so that a predominance of the particles become united in clusters and a relatively few only of the particles become adhesively united to the fiber, as is shown in the photomicrograph of Fig. 2. In the illustrative apparatus shown, radiant heating panels 64, 66 are disposed on each side of the traveling mat, for heating the resin particles in the mat. This embodiment is employed with resins of the type which become tacky upon heating. For use with resins which are best rendered tacky by treatment with a vapor, such as an organic solvent or water vapor, I provide a casing 68 surrounding the traveling mat and having an entrance port 70 and an exit port 72 through which a vapor of the appropriate kind can be caused to flow. From the casing 68 the mat continues downwardly to be rolled as a completed resin-loaded fiber glass sheet into the roll 74 as shown.

In the same way we may incorporate into the product a woven or unwoven (felted) sheet or layer. This sheet or layer may be an open mesh fabric such as scrim or may be a closely-woven fabric. It may comprise cotton, wool, rayon, or other textile material.

If such an integral carrier element is not desired, a belt 76 of burlap or the like, may be employed to serve as a temporary carrier for mat 24, passing about the two lower rolls 78 and 80, then upwardly over the belt 28 and through the needling machine, being separated from the needled mat as it leaves the lower of the pressure rolls 60 to return about the two lower rolls 78, 80, the mat being wound up at 74, as before, as a finished fabric.

In any case, the cut strands are mechanically associated in the form of a mat, with the individual cut lengths thereof randomly oriented in the plane of the mat, although lying generally in or parallel to this plane, so that the ultimate product normally exhibits strands in all directions in the plane thereof. These cut strands, surprisingly, largely retain their initial form as discrete bundles of filaments notwithstanding the mat has undergone the described needling operation to such an extent as to cause such displacement and intertangling of fibers as to cause the mat, so formed, but without the addition of resin, to be coherent and self-sustaining when handled. Also, by means of the needling of the strands, sufficient stability is imparted to the bundles, or strands, thus bound together to form a product of sufficient integrity and strength to make it useful for plastic moulding and some other purposes, even without the aforementioned carrier member and independently of its resin content. If a relatively smooth and continuous surface is necessary for the particular use, however, then a carrier element may be supplied to the mat as heretofore described and left in place to form a facing sheet.

Multiple plies of bat may be fed to the flared entrance of the needling device and then united by the needling operation to thereby form an integral product.

In the manufacture of plastic molded products it is often desirable to have much greater strength in one direction than in others. By my process it is possible to incorporate in the product a greater density of glass unidirectionally so as to achieve this end. For the purpose of imparting this additional strength longitudinally or transversely, or both, without increasing the bulk of the product materially, a minor amount of individual glass fiber strands of long length may be incorporated in the mat, for example, by having a series of said strands 82 wound on a spool or beam 84 which is then suitably mounted so that the strands may be fed to the mat before it is needled. Where a surface web is employed, the strands may be fed to the mat at the point where the surface web and the mat of fibers are brought together, preferably inserting these individual strands so that they will extend longitudinally in the fabric substantially between the surface web and the fibrous mat. Where separate mats may be formed and then united, as disclosed above, these uni-directional filaments or strands would preferably be inserted between two mats. If additional tensile strength transversely is desired these filaments or strands may be incorporated in a light-weight web by any well known means, as, for example, by affixing them longitudinally to a light-weight surface web such as described above. This surface web with the strands attached thereto would then be cut into strips corresponding to the width of the mat being produced and successive strips fed to the top or bottom surface of the mat so that the strands attached to the surface web will extend transversely of the mat, or such strips could be inserted between mats.

I have also found that the resin may be incorporated in the mat after the needling operation, although I prefer to add it before needling and cause it to be distributed within the mat by the needling operation. If it is applied subsequently, the powder may be spread over the upper surface of the mat and then caused to penetrate into the mat, and into the pockets left by the needles, and be distributed throughout the mat by subjecting the mat and powder to agitation or vibration.

Also, if desired, the mat manufactured as above, but without the resin, may be cut to any desired lengths or shapes and the powered resin applied thereto and deposited therein by vibrating or agitating the mat.

The powdered resin material may be any of the resinous or resin-forming materials suitable for use in the formation by molding under heat and pressure of glass fiber reinforced plastic articles. Many such resins are well known in the art, such as the phenolics, including phenol formaldehyde resins and the aldehyde polyphenyl borate resins (Patent No. 2,623,866), the melamines, styrene and derivatives, vinyl resins such as copolymers of vinyl chloride and vinyl acetate, cellulose esters and ethers, the polyester resins, and mixtures thereof. The resin may be in partially or completely reacted condition and the powder added to the mat may include in addition to resin or resin-forming material various compounding ingredients such as fillers. All of these materials are embraced within the terms resin and resin-forming materials or compounds as used herein.

The resin component, when incorporated in the mat, must be in finely divided solid form of such a small size that it readily may penetrate into the interstices between the fibers. Particle sizes of the order of 200 mesh are suitable.

I claim:

1. A glass fiber-resin sheet suitable without addition of resin thereto for use as a moldable material in forming permanently-shaped glass fiber-reinforced plastic articles by heat and pressure molding, comprising a coherent, self-sustaining, low density, flexible, extensible, conformable and vapor-permeable mat of glass fiber material in the form of short, cut, staple-length glass fibers extending generally parallel to the plane of the mat but randomly oriented in planes parallel to said plane, a relatively small but significant amount of transverse glass fibers extending among the first-mentioned fibers in the direction of the thickness of the mat, thereby interconnecting said fibers, and particles of a heat and pressure moldable synthetic-resin composition, in an amount between 35% and 80% of the combined weight of particles and fiber, distributed among the voids between said fibers and along and adjacent to said transverse fibers, a predominance of said resin particles being in the form of clusters retained within the sheet, to permit handling thereof without appreciable separation and loss of resin, by occasional adhesive bonds between some particles and glass fibers, the great majority of the particles being free of direct adhesive bond to fiber, whereby the integrity and the self-sustaining quality of the sheet is maintained primarily by said transverse fibers, thus preserving the flexibility, extensibility and conformability of the sheet.

2. A glass fiber-resin sheet suitable without addition of resin thereto for use as a moldable material in forming permanently-shaped glass fiber-reinforced plastic articles by heat and pressure molding, comprising a coherent, self-sustaining, low density, flexible, extensible, conformable and vapor-permeable mat of glass fiber material in the form of short, cut, staple-length bundles each containing a multiplicity of glass fibers, said bundles extending generally parallel to the plane of the mat but randomly oriented in planes parallel to said plane, a relatively small but significant amount of transverse glass fibers extending among said bundles in the direction of the thickness of the mat, thereby interconnecting said bundles, and particles of a heat and pressure moldable synthetic-resin composition, in an amount between 35% and 80% of the combined weight of particles and fiber, distributed among the voids between the fibers of the mat and along and adjacent to said transverse fibers, a predominance of said resin particles being in the form of clusters retained within the sheet, to permit handling thereof without appreciable separation and loss of resin, by occasional adhesive bonds between some particles and glass fibers, the great majority of the particles being free of direct adhesive bond to fiber, whereby the integrity and the self-sustaining quality of the sheet is maintained primarily by said transverse fibers, thus preserving the flexibility, extensibility and conformability of the sheet.

3. A glass fiber-resin sheet suitable without addition of resin thereto for use as a moldable material in forming permanently-shaped glass fiber-reinforced plastic articles by heat and pressure molding, comprising a coherent, self-sustaining, low density, flexible, extensible, conformable and vapor-permeable mat of glass fiber material in the form of short, cut, staple-length glass fibers extending generally parallel to the plane of the mat but randomly oriented in planes parallel to said plane, a web on one side thereof comprising a layer of glass fibers adhesively bonded into a coherent self-sustaining web, a relatively small but significant amount of transverse glass fibers extending through said web and among the first-mentioned fibers in the direction of the thickness of the mat, thereby interconnecting the glass fibers, and particles of a heat and pressure moldable synthetic-resin composition, in an amount between 35% and 80% of the combined weight of particles and fiber, distributed among the voids between the fibers of the mat and along and adjacent to said transverse fibers, a predominance of said resin particles being in the form of clusters retained within the sheet, to permit handling thereof without appreciable separation and loss of resin, by occasional adhesive bonds between some particles and glass fibers, the great majority of the particles being free of direct adhesive bond to fiber, whereby the integrity and the self-sustaining quality of the sheet is maintained primarily by said transverse fibers, thus preserving the flexibility, extensibility and conformability of the sheet.

4. A glass fiber-resin sheet suitable without addition of resin thereto for use as a moldable material in forming permanently-shaped glass fiber-reinforced plastic articles by heat and pressure molding, comprising a coherent, self-sustaining, low density, flexible, extensible, conformable and vapor-permeable mat of glass fiber material in the form of short, cut, staple-length bundles each containing a multiplicity of glass fibers bound together by an adhesive, said bundles extending generally parallel to the plane of the mat but randomly oriented in planes parallel to said plane, a relatively small but significant amount of transverse glass fibers extending among said bundles in the direction of the thickness of the mat, thereby interconnecting said bundles, and particles of a heat and pressure moldable synthetic-resin composition, in an amount between 35% and 80% of the combined weight of particles and fiber, distributed among the voids between the fibers of the mat and along and adjacent to said transverse fibers, a predominance of said resin particles being in the form of clusters retained within the sheet, to permit handling thereof without appreciable separation and loss of resin, by occasional adhesive bonds between some particles and glass fibers, the great majority of the particles being free of direct adhesive bond to fiber, whereby the integrity and the self-sustaining quality of the sheet is maintained primarily by said transverse fibers, thus preserving the flexibility, extensibility and conformability of the sheet.

5. A glass fiber-resin sheet suitable without addition of resin thereto for use as a moldable material in forming permanently-shaped glass fiber-reinforced plastic articles by heat and pressure molding, comprising a coherent, self-sustaining, low density, flexible, extensible, conformable and vapor-permeable mat of glass fiber material in the form of short, cut, staple-length bundles each containing a multiplicity of glass fibers bound together by an adhesive, said bundles extending generally parallel to the plane of the mat but randomly oriented in planes parallel to said plane, a facing web comprising a layer of glass fibers adhesively bonded into a coherent, self-sustaining web, a relatively small but significant amount of transverse glass fibers extending through said web and among said bundles in the direction of the thickness of the mat, thereby interconnecting the glass fibers and web, and particles of a heat and pressure moldable synthetic-resin composition, in an amount between 35% and 80% of the combined weight of particles and fiber, distributed among the voids between the fibers of the mat and along and adjacent to said transverse fibers, a predominance of said resin particles being in the form of clusters retained within the sheet, to permit handling thereof without appreciable separation and loss of resin, by occasional adhesive bonds between some particles and glass fibers, the great majority of the particles being free of direct adhesive bond to fiber, whereby the integrity and the self-sustaining quality of the sheet is maintained primarily by said transverse fibers, thus preserving the flexibility, extensibility and conformability of the sheet.

6. The method of making a coherent, self-sustaining, low density, flexible, extensible, conformable and vapor-permeable glass fiber-resin sheet suitable without addition of resin thereto for use as a moldable material in forming permanently-shaped glass fiber-reinforced plastic articles by heat and pressure molding, which comprises providing a mat of loose short, cut, staple-length glass fibers wherein most of the fibers are disposed generally parallel to the plane of the mat but are randomly oriented in planes parallel to said plane, applying to the upper surface of the mat finely-divided particles of a synthetic-resin molding composition, thereafter needling the mat to cause a relatively small but significant amount of fibers to be displaced to extend in the direction of the thickness of the mat and simultaneously create voids extending depthwise of the mat and agitate the fibers and said particles to cause the particles to penetrate the mat and fall into said voids to distribute within the mat and along and adjacent to said transversely extending fibers an amount of particles by weight between 35% and 80% of the combined weight of particles and fiber, treating said distributed particles to cause them to become tacky without flow and to cause a predominance of the particles to become united in clusters and a relatively few only of the particles to become adhesively connected to the fiber, to retain the resin in the mat and thus permit handling of the sheet without appreciable separation and loss of resin therefrom, while maintaining the flexibility, extensibility and conformability of the sheet.

7. The method of making a coherent, self-sustaining, low-density, flexible, extensible, conformable and vapor-permeable glass fiber-resin sheet suitable without addition of resin thereto for use as a moldable material in forming permanently-shaped glass fiber-reinforced plastic articles by heat and pressure molding, which comprises providing a mat of loose short, cut, staple-length glass fibers wherein most of the fibers are in the form of bundles each containing a multiplicity of glass fibers, said bundles being disposed generally parallel to the plane of the mat but randomly oriented in planes parallel to said plane, applying to the upper surface of the mat finely-divided particles of a synthetic resin molding composition, thereafter needling the mat to cause a relatively small but significant amount of fibers to be displaced to extend among said bundles in the direction of the thickness of the mat and simultaneously create voids extending depthwise of the mat and agitate the fibers and said particles to cause the particles to penetrate the mat and fall into said voids to distribute within the mat and along and adjacent to said transverse fibers an amount of particles by weight between 35% and 80% of the combined weight of particles and fiber, treating said distributed particles to cause them to become tacky without flow and to cause a predominance of the particles to become united to each other in clusters and a relatively few only of the particles to become adhesively connected to the fiber, to retain the resin in the mat and thus permit handling of the sheet without appreciable separation and loss of resin therefrom, while maintaining the flexibility, extensibility and conformability of the sheet.

8. The method of making a coherent, self-sustaining, low-density, flexible, extensible, conformable and vapor-permeable glass fiber-resin sheet suitable without addition of resin thereto for use as a moldable material in forming permanently-shaped glass fiber-reinforced plastic articles by heat and pressure molding, which comprises providing a mat of loose short, cut, staple-length glass fibers wherein most of the fibers are disposed generally parallel to the plane of the mat but are randomly oriented in planes parallel to said plane, a web on the lower face of the mat comprising a relatively thin layer of glass fibers adhesively bonded into a coherent self-sustaining web, applying to the upper surface of the mat finely-divided particles of a synthetic resin molding composition, thereafter needling the mat to cause a relatively small but significant amount of fibers to be displaced to extend among the first-mentioned fibers and through said web in the direction of the thickness of the mat and simultaneously create voids extending depthwise of the mat and agitate the fibers and said particles to cause the particles to penetrate the mat and fall into said voids to distribute within the mat and along and adjacent to said transversely extending fibers an amount of particles by weight in excess of 35% of the combined weight of particles and fiber, treating said distributed particles to cause them to become tacky without flow and to cause a predominance of the particles to become united to each other in clusters and a relatively few only of the particles to become adhesively connected to the fiber, to retain the resin in the mat and thus permit handling of the sheet without appreciable separation and loss of resin therefrom, while maintaining the flexibility, extensibility and conformability of the sheet.

9. The method of making a coherent, self-sustaining, low-density, flexible, extensible, conformable and vapor-permeable glass fiber-resin sheet suitable without addition of resin thereto for use as a moldable material in forming permanently-shaped glass fiber-reinforced plastic articles by heat and pressure molding, which comprises providing a mat of loose short, cut, staple-length glass fibers wherein most of the fibers are in the form of bundles each containing a multiplicity of glass fibers bound together by an adhesive, said bundles being disposed generally parallel to the plane of the mat but randomly oriented in planes parallel to said planes, applying to the upper surface of the mat finely-divided particles of a synthetic resin molding composition, thereafter needling the mat to cause a relatively small but significant amount of fibers to be displaced to extend among said bundles in the direction of the thickness of the mat and simultaneously create voids extending depthwise of the mat and agitate the fibers and said particles to cause the particles to penetrate the mat and fall into said voids to distribute within the mat and along and adajacent to said transverse fibers an amount of particles by weight in excess of 35% of the combined weight of particles and fiber, treating said distributed particles to cause them to become tacky without flow and to cause a predominance of the particles to become united to each other in clusters and a relatively few only of the particles to become adhesively connected to the fiber, to retain the resin in the mat and thus permit handling of the sheet without appreciable separation and loss of resin therefrom, while maintaining the flexibility, extensibility and conformability of the sheet.

10. The method of making a coherent, self-sustaining, low-density, flexible, extensible, conformable and vapor-permeable glass fiber-resin sheet suitable without addition of resin thereto for use as a moldable material in forming permanently-shaped glass fiber-reinforced plastic articles by heat and pressure molding, which comprises providing a mat of loose short, cut, staple-length glass fibers wherein most of the fibers are in the form of bundles each containing a multiplicity of glass fibers bound together by an adhesive, said bundles being disposed generally parallel to the plane of the mat but randomly oriented in planes parallel to said plane, a facing web on the lower face of the mat comprising a layer of glass fibers adhesively bonded into a coherent self-sustaining web, applying to the upper surface of the mat finely-divided particles of a synthetic resin molding composition, thereafter needling the mat to cause a relatively small but significant amount of fibers to be displaced to extend among said bundles and through said web in the direction of the thickness of the mat and simultaneously create voids extending depthwise of the mat and agitate the fibers and said particles to cause the particles to penetrate the mat and fall into said voids to distribute within the mat and along and adjacent to said transversely extending fibers an amount of particles by weight between 35% and 80% of the combined weight of particles and fiber, heating said distributed particles below their fusion point to cause them to become tacky without flow and to cause a predominance of the particles to become united in clusters and relatively few only of the particles to become adhesively connected to the fiber to retain the resin in the mat and thus permit handling of the sheet without appreciable separation and loss of resin therefrom while maintaining the flexibility, extensibility and conformability of the sheet.

11. The method of making a coherent, self-sustaining, low density, flexible, extensible, conformable and vapor-permeable glass fiber-resin sheet suitable without addition of resin thereto for use as a moldable material in forming permanently-shaped glass fiber-reinforced plastic articles by heat and pressure molding, which comprises providing a mat of loose short, cut, staple-length glass fibers wherein most of the fibers are disposed generally parallel to the plane of the mat but are randomly oriented in planes parallel to said plane, thereafter needling the mat to cause a relatively small but significant amount of fibers to be displaced to extend in the direction of the thickness of the mat and simultaneously create voids extending depthwise of the mat, applying to the upper surface of the mat finely-divided particles of a synthetic-resin molding composition, agitating the fibers and said particles to cause the particles to penetrate the mat and fall into said voids to distribute within the mat and along and adjacent to said transversely extending fibers an amount of particles by weight between 35% and 80% of the combined weight of particles and fiber, treating said distributed particles to cause them to become tacky without flow and to cause a predominance of the particles to become united in clusters and a relatively few only of the particles to become adhesively connected to the fiber, to retain the resin in the mat and thus permit handling of the sheet without appreciable separation and loss of resin therefrom, while maintaining the flexibility, extensibility and conformability of the sheet.

12. The method of making a coherent, self-sustaining, low-density, flexible, extensible, conformable and vapor-permeable glass fiber-resin sheet suitable without addition of resin thereto for use as a moldable material in forming permanently-shaped glass fiber-reinforced plastic articles by heat and pressure molding, which comprises providing a mat of loose short cut, staple-length glass fibers wherein most of the fibers are disposed generally parallel to the plane of the mat but randomly oriented in planes parallel to said plane, needling the mat to cause a relatively small but significant amount of fibers to be displaced to extend in the direction of the thickness of the mat and simultaneously create voids extending depthwise of the mat, thereafter applying to the upper surface of the mat finely divided particles of a synthetic resin molding composition, thereafter agitating the fibers and said particles to cause the particles to penetrate the mat and fall into said voids to distribute within the mat and along and adjacent to said transverse fibers an amount of particles by weight between 35% and 80% of the combined weight of particles and fiber, treating said distributed particles to cause them to become tacky without flow and to cause a predominance of the particles to become united to each other in clusters and a relatively few only of the particles to become adhesively connected to the fiber, to retain the resin in the mat and thus permit handling of the sheet without appreciable separation and loss of resin therefrom, while maintaining the flexibility, extensibility and conformability of the sheet.

13. The method of making a coherent, self-sustaining, low density, flexible, extensible, conformable and vapor-permeable glass fiber-resin sheet suitable without addition of resin thereto for use as a moldable material in forming permanently-shaped glass fiber-reinforced plastic articles by heat and pressure molding, which comprises providing a mat of short, cut, staple-length glass fibers wherein most of the fibers, are disposed generally parallel to the plane of the mat but are randomly oriented in planes parallel to said plane, displacing a relatively small but significant amount of fibers to cause them to extend transversely in the direction of the thickness of the mat, applying to the upper surface of the mat finely-divided particles of a synthetic-resin molding composition, agitating the fibers and said particles to cause the particles to penetrate the mat to distribute within the mat and along and adjacent to said transversely extending fibers an amount of particles by weight between 35% and 80% of the combined weight of particles and fiber, treating said distributed particles to cause them to become tacky without flow and to cause a predominance of the particles to become united in clusters and a relatively few only of the particles to become adhesively connected to the fiber, to retain the resin in the mat and thus permit handling of the sheet without appreciable separation and loss of resin thereform while maintaining the flexibility, extensibility and conformability of the sheet.

References Cited in the file of this patent

UNITED STATES PATENTS

| | | |
|---|---|---|
| 2,372,433 | Koon | Mar. 27, 1945 |
| 2,373,033 | Kopplin | Apr. 3, 1945 |
| 2,493,845 | Zettel | Jan. 10, 1950 |
| 2,635,322 | McDermott | Apr. 21, 1953 |
| 2,671,496 | Chavannes et al. | Mar. 9, 1954 |
| 2,702,261 | Bacon et al. | Feb. 15, 1955 |

FOREIGN PATENTS

| | | |
|---|---|---|
| 668,217 | Great Britain | Mar. 12, 1952 |